United States Patent [19]

Lehman

[11] Patent Number: 4,970,242
[45] Date of Patent: Nov. 13, 1990

[54] ANHYDROUS, NONFLAMMABLE TIRE SEALER AND INFLATOR

[75] Inventor: Richard W. Lehman, Pandoro, Ohio

[73] Assignee: Nationwide Industries, Inc., Durham, N.C.

[21] Appl. No.: 395,775

[22] Filed: Aug. 18, 1989

[51] Int. Cl.$^5$ .............................................. C08J 9/00
[52] U.S. Cl. ...................................... 521/78; 106/33; 521/79; 521/81; 521/84.1; 521/150
[58] Field of Search ............... 521/78, 79, 81, 84.1, 521/150; 523/166; 524/272, 13; 106/33

[56] References Cited

U.S. PATENT DOCUMENTS

| | | | |
|---|---|---|---|
| 2,843,883 | 7/1958 | Rockoff | 521/150 |
| 2,991,629 | 10/1957 | Rose | 62/48 |
| 3,705,669 | 12/1972 | Cox | 521/78 |
| 3,843,586 | 10/1974 | Wolf | 260/29.7 R |
| 3,912,665 | 10/1975 | Spitzer | 521/78 |
| 3,970,623 | 7/1976 | Feeney | 524/272 |
| 4,054,163 | 10/1977 | Brown, Jr. et al. | 141/291 |
| 4,137,206 | 1/1979 | Kent | 523/166 |
| 4,422,877 | 12/1983 | Spitzer | 521/78 |
| 4,501,825 | 2/1985 | Magyar et al. | 521/78 |
| 4,513,803 | 4/1985 | Reese | 152/427 |
| 4,582,108 | 4/1986 | Markow et al. | 152/418 |

*Primary Examiner*—Morton Foelak
*Attorney, Agent, or Firm*—Richard E. Jenkins

[57] ABSTRACT

A novel anhydrous nonflammable tire sealer and inflator composition comprising a hydrochlorofluorocarbon (HCFC) propellant, a solvent, and a rubber resin soluble in the solvent. The composition is packaged in aerosol cans and is used to seal and inflate punctured pneumatic tires. The composition utilizes a solvent-based adhesive resin with a hydrochlorofluorocarbon propellant in order to provide a nonflammable composition which does not utilize environmentally objectionable chlorofluorocarbon (CFC) propellants.

24 Claims, No Drawings

ANHYDROUS, NONFLAMMABLE TIRE SEALER AND INFLATOR

TECHNICAL FIELD

This invention relates to a novel anhydrous, nonflammable composition useful as a tire sealant and inflator. More particularly, the composition contains a hydrochlorofluorocarbon (HCFC) propellant and a solvent-based resin adhesive which serves both to depress the vapor pressure of the propellant and to act as the sealing component of the novel tire sealer and inflator composition.

BACKGROUND ART

Portable aerosol tire sealer and inflator kits are well known for use in an emergency to inflate and temporarily seal a pneumatic tire with a puncture wound when a service station or other repair facility is not available to a motorist. The use of the product, typically for an automobile, allows the motorist to drive the vehicle to a convenient location where the punctured tire can be inspected and repaired. The repair kit obviates the need for a motorist to remove the punctured tire from an automobile and replace it with a spare tire in order to reach a service station or the like for repair of the damaged tire. Perhaps even more importantly, use of the portable tire repair kit obviates the inconvenience and danger of being stranded on the road with a punctured tire if the motorist either does not have a spare tire or is physically unable to replace the punctured tire with a spare tire.

At the present time, all commercial tire repair kits known to applicant utilize a water-based adhesive as the sealing component of the composition and either a hydrocarbon propellant (such as propane, butane, and/or isobutane) or a chlorofluorocarbon propellant (such as Freon 12). Generally speaking, these tire repair kit products all suffer some relative shortcomings in that the hydrocarbon propellants are flammable and the chlorofluorocarbon (CFC) propellants have been found to have a detrimental effect on the earth's ozone layer and use thereof is being severely restricted. As a result of these factors, there is a need for a new tire sealant and inflator composition for tire repair kits which is nonflammable and which poses less of a threat to the ozone in the stratosphere above the earth ("environment friendly").

The present invention provides a new anhydrous, nonflammable tire sealant and inflator composition which represents an improvement in such compositions since it is not flammable and it does not utilize ozone depleting chlorofluorocarbon (CFC) as the inflation component.

DISCLOSURE OF THE INVENTION

In accordance with the present invention, applicant provides an anhydrous, nonflammable tire sealant and inflator composition comprising 20 to 70 weight percent of a hydrochlorofluorocarbon propellant, 10 to 75 weight percent of solvent, and 0.1 to 10 weight percent of rubber resin soluble in said solvent. Most suitably, 0.5 to 5 weight percent of at least one tackifying resin soluble in said solvent, 0.5 to 5 weight percent of at least one hardening resin soluble in said solvent, and about 0.1 to 2 weight percent of a corrosion inhibitor (such as barium dinonylnaphthalene sulfonate) may be used in the novel composition.

It is therefore the object of this invention to provide a sealant and inflator composition which is capable of sealing and inflating a tire with a puncture wound therein.

It is a further object of this invention to provide a sealant and inflator composition for sealing and inflating tires on passenger cars, vans and pick-up trucks in a quick and safe fashion.

A still further object of this invention is to provide a sealant and inflator composition for permanently sealing routine punctures in tires for passenger cars, vans and pick-up trucks in a quick and safe fashion.

A still further object of this invention is to provide a tire sealant and inflator composition which is nonflammable and which does not contain any chlorofluorocarbons.

Some of the objects of the invention having been stated, other objects will become evident as the description thereof proceeds.

BEST MODE FOR CARRYING OUT THE INVENTION

The anhydrous, nonflammable tire sealant and inflator composition of the present invention is intended for use as an aerosol product to inflate pneumatic tires of passenger cars, vans and pick-up trucks in a quick and safe manner when a source of compressed air or a repair station is not available to the motorist. Typically, the tire sealant and inflator composition is used in an aerosol product to inflate tires that have become punctured, and the composition seals the puncture wound and inflates the tire in order that the vehicle may be driven to a convenient location where the tire can be inspected and, if necessary, repaired. In many cases, the puncture will be permanently sealed by the novel composition and not require any additional repair work thereto.

In order to provide a product which meets these performance requirements and which is also nonflammable and does not utilize any chlorofluorocarbons, the present invention provides a novel tire sealant and inflator composition comprising:

| Components | Weight Percent |
|---|---|
| Hydrochlorofluorocarbon Propellant | 20–70 |
| Solvent | 10–75 |
| Rubber Resin | .1–10 |

The hydrochlorofluorocarbon (HCFC) of the composition is most suitably monochlorodifluoromethane which is manufactured and sold by DuPont under the trade name DYMEL 22. The advantage of hydrochlorofluorocarbon (HCFC) in substitution for chlorofluorocarbon (CFC) as the inflation component is that the HCFC is not presently considered a potential threat to reduce the ozone in the stratosphere around the earth. On the other hand, the use of CFC is being regulated throughout most of the world and the ultimate elimination of CFC use is probably imminent for all aerosol products, including tire sealant and inflator products. Thus, the use of monochlorodifluoromethane in the composition of the present invention is very desirable since it eliminates the problems inherent with the traditional CFC propellant used in most tire sealant and inflator products sold today. Moreover, it is not flammable as are hydrocarbon propellants such as propane, butane and/or isobutane which are also utilized in tire sealant and inflator products at the present time.

DYMEL 22 is a liquefied aerosol high pressure propellant which requires the presence of a vapor pressure depressant to reduce vapor pressure to a safe limit for packaging in standard aerosol cans. Moreover, DYMEL 22 if used in combination with conventional waterbased adhesive formulations would require that careful attention be given to the inhibitor system due to the possible hydrolysis of DYMEL 22 which would be very undesirable in an aerosol formulation. All commercial tire sealant and inflator compositions known to applicant presently utilize a water-based adhesive system, and this would not be satisfactory with the DYMEL 22 propellant.

Thus, applicant has conceived of the use of a solvent-based adhesive system with DYMEL 22 propellant in order to solve the problems which would be presented by attempting to utilize a water-based adhesive system therewith. This is a new concept and serves two functions: (1) to depress the vapor pressure of DYMEL 22; and (2) to act as the sealing component of the tire sealant and inflator composition. Most suitably, the solvent-based adhesive system comprises 10-75 weight percent (of the total tire sealant and inflator composition) of solvent with 0.1-10 weight percent (of the total tire sealant and inflator composition) of rubber resin soluble in the solvent. Optionally, 0.5-5 weight percent (of the total tire sealant and inflator composition) of at least one tackifying resin soluble in the solvent and 0.5-5 weight percent (of the total composition) of at least one hardening resin soluble in the solvent may be added to the composition.

Therefore, in order to reduce vapor pressure in the aerosol can as well as to prevent can corrosion and hydrolysis of the HCFC propellant, a solvent and adhesive system based on rubber resin soluble in the solvent was developed. The preferred solvent is 1,1,1-trichloroethane (available from Dow Chemical Company under the trade name Chlorothene SM) although other solvents could be used including perchloroethylene, 1,1-dichloro 2,2,2-trifluoroethane, methylene chloride, tetrachloroethane, trichloroethylene, 1,2-dichloro 2,2-difluoroethane, 1,1-dichloro 1 fluoroethane, 1 chloro 1,1-difluoroethane, and dichlorofluoromethane. Also, although the preferred rubber resin for the novel tire sealant and inflator composition is polybutadiene costyrene, other rubber resins may be utilized including polybutadiene, natural rubber, and neoprene rubber. If utilized in the composition, the preferred tackifying and hardening resins are both coumarone indene resins, but it is contemplated that other resins could be used. Although it is also an optional component, the invention contemplates the use of 0.1 to 2 weight percent of a corrosion inhibitor such as barium dinonylnaphthalene sulfonate in the sealant composition.

Applicant's novel tire sealant and inflator composition is a substantial improvement over previous commercial tire sealant and inflator compositions for the following reasons:
1. It is nonflammable;
2. It does not use a CFC propellant;
3. It does not utilize any water in the formulation; and
4. The solvent resin system used in the formulation provides for better sealing of tire puncture wounds.

Moreover, the solvent-based adhesive system is less messy and does not tend to contribute to tire unbalancing and rim corrosion as do water-based adhesives which typically utilize a considerable portion of water to spread the adhesive as well as to add extra weight to the aerosol can at no additional cost to the manufacturer.

Summarily, the resin-based adhesive system used in the present invention has been found to be capable of sealing larger puncture wounds in tires than previous water-based adhesive systems, as well as more quickly sealing puncture wounds in the tires. The resin-based adhesive system has been found not to remain tacky after use and in many cases will permanently seal smaller puncture wounds in tires so that additional repair will not be necessary.

The anhydrous, nonflammable tire sealant and inflator composition is described generally above, and the preferred composition is as follows:

| Components | Weight Percent |
| --- | --- |
| Monochlorofluoromethane Propellant | 40–55 |
| 1,1,1-Trichloroethane Solvent | 40–55 |
| Polybutadiene Co-Styrene Rubber Resin | 2–3 |
| Tackifying Resin | .5–1.5 |
| Hardening Resin | .5–1.5 |
| Corrosion Inhibitor | .1–.5 |

The aerosol can used to contain the novel composition of the present invention is conventional and well known to those skilled in the art. Generally, the aerosol can comprises a cylindrical sealed can of conventional volume and including a flexible tube extending from the top and having a screw nozzle on the remote end of the tube which is adapted to be screwed onto a tire valve stem. The other end of the tube is connected to a valve in the can top which can be opened by depressing a button so as to allow the pressurized sealant and inflator composition to be discharged from the can into the tire to be sealed and inflated. Although a tube and valve system is described herein, the invention contemplates the use of alternative actuator systems.

The novel composition in the can must contain sufficient monochlorodifluoromethane to inflate a pneumatic tire of the type found on passenger cars, vans and pick-up trucks. The amount of monochlorodifluoromethane will range from 2.0 mg/ml to 15 mg/ml based on the tire volume in milliliters. Also, a sufficient amount of 1,1,1-trichloroethane solvent must be used in the novel composition to reduce the aerosol pressure to safe aerosol can packaging limits. Typically, the 1,1,1-trichloroethane amount is about 0.5 to 3 times the amount of monochlorodifluoromethane in the sealant and inflator composition. As discussed above, a synthetic rubber resin which is soluble in the 1,1,1-trichloroethane (such as polybutadiene co-styrene) is added to the solvent at a rate of 0.3 mg/cm$^2$ to 15 mg/cm$^2$ based on the surface area of the target tire (which varies, for example, among thirteen, fourteen, and fifteen inch tires). The tackifying and hardening resins (both resins most suitably coumarone indene resins) which are soluble in the 1,1,1-trichloroethane are each added thereto at a rate of 0.15 mg/cm$^2$ to 7.5 mg/cm$^2$ in order to give the sealant and inflator composition product the optimal desired tack, drying time and hardness to seal pneumatic tire puncture wounds. Finally, the corrosion inhibitor (most suitably barium dinonylnaphthalene sulfonate) is added to the novel composition at a rate of 0.03 mg/cm$^2$ to 2.5 mg/cm$^2$ The preferred combination is 6.6 mg/ml of monochlorodifluoromethane, 6 mg/ml of 1,1,1-trichloroethane, 1.3 mg/cm$^2$ of polybutadiene co-styrene, 0.65 mg/cm$^2$ of coumarone indene tackifying resin, 0.65 mg/cm$^2$ of coumarone indene hardening resin, and 0.13 mg/cm$^2$ of barium dinonylnaphthalene sulfonate corrosion inhibitor. The contents of the aerosol can should discharge through the aerosol valve at a high discharge rate (most suitably about 30 seconds) in order to allow for quick inflation of the pneumatic tire.

Although other rubber resins may be used, preferred rubber resins for the novel composition of the invention are polybutadiene co-styrene resins available from Firestone under the trade names STEREON 840A, STEREON 730A, STEREON 720A, and SR7475. Other particularly suitable resins include American Synol resins number 1009, 8110, 8107, 1013, 1011A, 1011 and 4503.

As noted earlier, monochlorodifluoromethane is available from DuPont under the trade name DYMEL 22. Also, although there are a number of sources therefore, 1,1,1-trichloroethane obtained from Dow Chemical Company under the trade name CHLOROTHENE SM has been found to work well in the novel formulation.

The preferred tackifying resin and the preferred hardening resin for the novel tire sealant and inflator composition are CUMAR P-25 and CUMAR R-6, respectively, from Neville Chemical Company which are most suitably mixed 50/50 prior to being added to the composition. However, any of the CUMAR, NEVCHEM, NEBONY, NEVILLAC, LX, and NEVTAC resins, and admixtures thereof, from Neville may be used. These are hydrocarbon resins and the proportions proposed by applicant are important to achieving the optimal desired tack and hardness to seal pneumatic tire puncture wounds before the resin and propellant leak out from the punctured pneumatic tire.

The invention will be further illustrated with reference to the examples described below.

EXAMPLE 1

The following is a composition formulation for a 14 inch pneumatic automobile tire which has been tested and found to seal a 3/16 inch nail puncture in the tire:
  50% DYMEL 22 monochlorodifluoromethane propellant
  45.34% CHLOROTHENE SM 1,1,1-trichloroethane solvent
  2.34% STEREON 840A polybutadiene co-styrene rubber resin
  1.04% CUMAR P-25 tackifying hydrocarbon resin
  1.04% CUMAR R-6 hardening hydrocarbon resin
  0.2% Barium dinonylnaphthalene sulfonate corrosion inhibitor
(382 gram formulation in 2Q aerosol can)

EXAMPLE 2

The following is a tire sealant and inflator formulation for a 15 inch pneumatic automobile tire which has been tested and found to seal a 3/16 inch nail puncture in a 15 inch pick-up truck tire. The hole was sealed and driven for 2000 miles without any necessity for further repair:
  DYMEL 22 monochlorodifluoromethane propellant
  45.34% CHLOROTHENE SM 1,1,1-trichloroethane solvent
  2.35% SR7475 polybutadiene co-styrene rubber resin
  1.04% CUMAR P-25 tackifying hydrocarbon resin
  1.04% CUMAR R-6 hardening hydrocarbon resin
  0.2% Barium dinonylnaphthalene sulfonate corrosion inhibitor
(454 gram formulation in a 2Q aerosol can)

EXAMPLE 3

The following is a composition formulation for a 13 inch pneumatic automobile tire which has been found to seal a ⅛ inch puncture in a tire;
  45% DYMEL 22 monochlorodifluoromethane propellant
  50.34% CHLOROTHENE SM 1,1,1-trichloroethane solvent
  2.4% SYNOL 1009 polybutadiene co-styrene rubber resin
  1.0% CUMAR P-25 tackifying hydrocarbon resin
  1.0% CUMAR LX509 hardening hydrocarbon resin
  0.2% Barium dinonylnaphthalene sulfonate corrosion inhibitor
(340 gram formulation in 2Q can)

It will thus be seen that there has been described above a novel anhydrous, nonflammable pneumatic tire sealant and inflator composition which is particularly effective and does not utilize an environmentally objectionable chlorofluorocarbon propellant.

It will be understood that various details of the invention will be changed without departing from the scope of the invention. Furthermore, the foregoing description is for the purpose of illustration only, and not for the purpose of limitation—the invention being defined by the claims.

What is claimed is:

1. An anhydrous, nonflammable tire sealant and inflator composition comprising:
  20 to 70 weight percent of a hydrochlorofluorocarbon propellant;
  10 to 75 weight percent of solvent; and
  0.1 to 10 weight percent of butadiene-styrene rubber copolymer and/or natural rubber soluble in said solvent.

2. An anhydrous, nonflammable tire sealant and inflator composition according to claim 1 wherein said hydrochlorofluorocarbon propellant is monochlorodifluoromethane.

3. An anhydrous, nonflammable tire sealant and inflator composition according to claim 1 wherein said solvent is 1,1,1-trichloroethane.

4. An anhydrous, nonflammable tire sealant and inflator composition according to claim 1 further including 0.5 to 5 weight percent of at least one tackifying resin soluble in said solvent.

5. An anhydrous, nonflammable tire sealant and inflator composition according to claim 1 further including 0.5 to 5 weight percent of at least one hardening resin soluble in said solvent.

6. An anhydrous, nonflammable tire sealant and inflator composition according to claim 4 or claim 5 wherein said resin is coumarone indene resin.

7. An anhydrous, nonflammable tire sealant and inflator composition according to claim 1 further including 0.1 to 2 weight percent of a corrosion inhibitor.

8. An anhydrous, nonflammable tire sealant and inflator composition according to claim 7 wherein said corrosion inhibitor comprises barium dinonylnaphthalene sulfonate.

9. An anhydrous, nonflammable tire sealant and inflator composition comprising:

20 to 70 weight percent of monochlorodifluoromethane propellant;

10 to 75 weight percent of solvent selected from the group consisting of 1,1,1-trichloroethane, perchloroethylene, 1,1-dichloro 2,2,2-trifluoroethane, methylene chloride, tetrachloroethane, trichloroethylene, 1,2-dichloro, 2,2-difluoroethane, 1,1-dichloro 1 fluoroethane, 1 chloro 1,1-difluoroethane, and dichlorofluoromethane;

0.1 to 10 weight percent of butadiene-styrene rubber copolymer and/or natural rubber soluble in said solvent;

0.5 to 5 weight percent of at least one tackifying resin comprising thermoplastic hydrocarbon resin soluble in said solvent; and 0.5 to 5 weight percent of at least one hardening resin comprising thermoplastic hydrocarbon resin soluble in said solvent.

10. An anhydrous, nonflammable tire sealant and inflator composition according to claim 9 further including 0.1 to 2 weight percent of a corrosion inhibitor.

11. An anhydrous, nonflammable tire sealant and inflator composition according to claim 10 wherein said corrosion prohibitor comprises barium dinonylnaphthalene sulfonate.

12. An aerosol container which contains the following anhydrous, nonflammable tire sealant and inflator composition:
 20 to 70 weight percent of a hydrochlorofluorocarbon propellant;
 10 to 75 weight percent of solvent; and
 0.1 to 10 weight percent of butadiene-styrene rubber copolymer and/or natural rubber soluble in said solvent, 13. An anhydrous, nonflammable tire sealant and inflator composition according to claim 12 further including 0.5 to 5 weight percent of at least one tackifying resin soluble in said solvent.

14. An anhydrous, nonflammable tire sealant and inflator composition according to claim 12 further including 0.5 to 5 weight percent of at least one hardening resin soluble in said solvent.

15. An aerosol container according to claim 13 or 14 wherein said resin is coumarone indene resin.

16. An aerosol container according to claim 12 wherein said hydrochlorofluorocarbon propellant is monochlorodifluoromethane.

17. An aerosol container according to claim 12 wherein said solvent is 1,1,1-trichloroethane.

18. An aerosol container according to claim 12 further including 0.1 to 2 weight percent of a corrosion inhibitor.

19. An aerosol container according to claim 18 wherein said corrosion inhibitor comprises barium dinonylnaphthalene sulfonate.

20. An aerosol container which contains the following anhydrous, nonflammable tire sealant and inflator composition:

20 to 70 weight percent of monochlorodifluoromethane propellant;

10 to 75 weight percent of solvent selected from the group consisting of 1,1,1-trichloroethane, perchloroethylene, 1,1-dichloro 2,2,2-trifluoroethane, methylene chloride, tetrachloroethane, trichloroethylene, 1,2-dichloro 2,2-difluoroethane, 1,1-dichloro 1 fluoroethane, 1 chloro 1,1-difluoroethane, and dichlorofluoromethane.

0.1 to 10 weight percent of butadiene-styrene rubber copolymer and/or natural rubber soluble in said solvent;

0.5 to 5 weight percent of at least one tackifying resin comprising thermoplastic hydrocarbon resin soluble in said solvent; and 0.5 to 5 weight percent of at least one hardening resin comprising thermoplastic hydrocarbon resin soluble in said solvent.

21. An aerosol container according to claim 20 further including 0.1 to 2 weight percent of a corrosion inhibitor.

22. An aerosol container according to claim 21 wherein said corrosion prohibitor comprises barium dinonylnaphthalene sulfonate.

23. An anhydrous, nonflammable tire sealant and inflator composition comprising:
 40 to 55 percent of monochlorodifluoromethane propellant;
 40 to 55 weight percent of 1,1,1-trichloroethane solvent;
 2 to 3 weight percent of butadiene-styrene rubber copolymer and/or natural rubber soluble in said solvent;
 0.5 to 1.5 weight percent of at least one tackifying resin comprising thermoplastic hydrocarbon resin soluble in said solvent;
 0.5 to 1.5 weight percent of at least one hardening resin comprising thermoplastic hydrocarbon resin soluble in said solvent; and
 0.1 to 0.5 weight percent of corrosion inhibitor.

24. An aerosol container which contains the following anhydrous, nonflammable tire sealant and inflator composition:
 40 to 55 weight percent of monochlorodifluoromethane propellant;
 40 to 55 weight percent of 1,1,1-trichloroethane solvent;
 2 to 3 weight percent of butadiene-styrene rubber copolymer and/or natural rubber soluble in said solvent;
 0.5 to 1.5 weight percent of at least one tackifying resin comprising thermoplastic hydrocarbon resin soluble in said solvent;
 0.5 to 1.5 weight percent of at least one hardening resin comprising thermoplastic hydrocarbon resin soluble in said solvent; and
 0.1 to 0.5 weight percent of corrosion inhibitor.

* * * * *